Patented June 24, 1947

2,423,071

UNITED STATES PATENT OFFICE 2,423,071

ALICYCLIC GUANAMINES

Jack Theo Thurston, Cos Cob, Conn., assignor to American Cyanamid Company, New York, N. Y., a corporation of Maine No Drawing. Application August 30, 1941, Serial No. 409,146

8 Claims. (Cl. 260—249.5)

This invention relates to alicyclic guanamines, that is to say, guanamines in which the 2-carbon atom of the 4,6-diamino-1,3,5-triazine ring is substituted by an alicyclic radical through a carbon-to-carbon bond. The invention also includes improved methods of preparing such compounds.

Guanamines have obtained considerable practical importance for the production of resins by reacting with formaldehyde. In order to have resins which before curing are organo-soluble and which have desirable properties for textile finishes, it has been found to be desirable to have a substituent on the 2-carbon atoms of the triazine ring which is aliphatic in nature and which is of sufficient molecular weight to confer the desired hydrophobic properties. Preferably the radical should contain more than seven carbon atoms and those containing a still larger number of carbon atoms are preferred. Alicyclic guanamines can be prepared from fairly cheap raw materials and are obtainable in good yields, particularly when a strongly basic condensing agent such as a metal alkoxide is used.

Among the alicyclic guanamines which can be produced according to the present invention are those from esters of hexahydrobenzoic acid, cyclohexylacetic acid, cyclopentylacetic acid and similar monocyclic acids. Another wide range of alicyclic guanamines are those from the tetrahydrophthalic acid group which are adducts of maleic anhydride and various unsaturated compounds such as butadiene, phellandrene, cyclopentadiene, alloöcimene, dehydrated castor oil containing conjugated octadecadiene groups, isomerized linseed and soya bean oils which likewise form dienic compounds with conjugated double bonds, and the like. Adducts with maleic anhydride and dienes which are not conjugated are also included such as the adducts from maleic anhydride and 9,12-linoleic acid esters, dipentene, and so forth. Many of the adducts are not symmetrical and therefore isomeric guanamines can be obtained depending upon the manner in which the anhydride is opened during half esterification.

The most important products of the present invention are the ones prepared from biguanide itself. In these products the amino groups of the triazine ring are unsubstituted and the products can be prepared with best yields and simplest procedures. However, the present invention also includes products prepared from substituted biguanides such as phenyl biguanide, allyl biguanide or dimethyl biguanide in which case the correspondingly substituted guanamines are obtained. When substituted biguanides are used in place of biguanide, the reaction does not proceed as rapidly and as completely and it is sometimes necessary to use a condensing agent such as sodium ethoxide, potassium methoxide, aluminum isopropoxide, and the like. Other materials such as sodamide which in alcohol solution form a metal alkoxide can also be employed.

The present invention is not limited to any particular process of making alicyclic guanamines. However, I prefer to prepare them from the esters of the corresponding alicyclic carboxylic acids and this is the preferred process. Any esters of alicyclic carboxylic acids may be used and there is no advantage in employing esters of alcohols which are expensive as the nature of the alcoholic group in the ester appears to play but little part in the effectiveness of the reaction. Thus, while it is possible to use esters of polyhydric alcohols such as glycerine, glycols, and the like, I prefer to use esters of monohydric alcohols and have found that the lower members such as methyl and ethyl esters are very effective and are quite cheap.

In general the preferred process of the present invention operates best in the presence of a suitable solvent for the biguanide and/or the ester. I have found that the lower molecular weight alcohols are particularly effective as they are good solvents for biguanide. The cheap monohydric paraffin alcohols such as methanol and ethanol operate well and are of particular advantage because the most readily available esters of the carboxylic acids are usually the methyl and ethyl esters, and if the alcohol which is used as a solvent corresponds to the alcohol radical of the ester, no separation problem arises. Excellent results are, however, obtained with the lower monohydric alcohols such as the ether alcohols, for example, the ethyl ether of ethylene glycol.

The invention will be described in greater detail in conjunction with the following specific examples.

*Example 1*

Naphthenoguanamine

A mixture of naphthenic acids having a neutral equivalent of 239 were esterified with butanol forming the butyl ester and condensed with equimolecular proportions of biguanide and sodium methylate. A syrupy liquid was obtained which on treatment with sulfuric acid and chloroform precipitated the sulfate salt of the naphthenoguanamine. It was filtered, washed with chloroform and dried. The salt was then dispersed in water and an excess of alkali added to form the free base which was then dissolved in methanol, decolorized with charcoal and precipitated by adding water. A 30% yield was obtained of a product melting between 64–76° C.

Example 2

2-carboxy-3-methyl-6-isopropyl endoethylene tetrahydro benzoguanamine

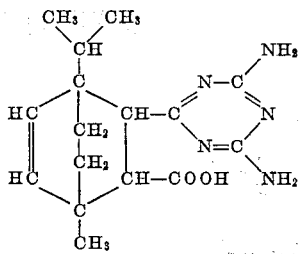

and 2-carboxy-3-isopropyl-6-methyl endoethylene tetrahydro benzoguanamine

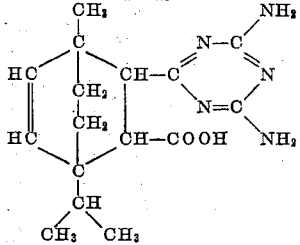

A methanol solution containing 102 parts of 3-methyl-6-isopropylendoethylene tetrahydrophthalic anhydride was refluxed for four hours and then slowly neutralized with 10 parts of sodium dissolved in methanol. Precipitation of the sodium salt was avoided by the addition of 300 parts of the ethyl ether of ethylene glycol. To the reaction mixture was then added 51 parts of biguanide which was stirred until it dissolved and the mixture was then allowed to stand at room temperature for a considerable period of time until reaction appeared to be substantially complete. The methanol was then evaporated and the product dissolved in water, acidified with dilute sulfuric acid and extracted three times with carbon tetrachloride. The guanamine in the form of its sulfate was immiscible both with water and with carbon tetrachloride and was neutralized with ammonium hydroxide, the free base being precipitated from solution as a fine white powder which after several washings with water gave a product melting at 225–226° C. The yield was approximately 40%.

Example 3

2-carboxy-6-(ω-carbomethoxy-α-n-nonenyl)-3-n-butyltetrahydrobenzoguanamine

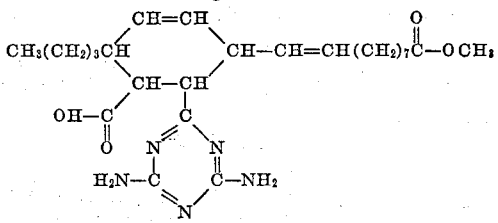

and 2-carboxy-6-(ω-carbomethoxy-n-heptyl)-3-α-n-hexenyltetrahydrobenzoguanamine

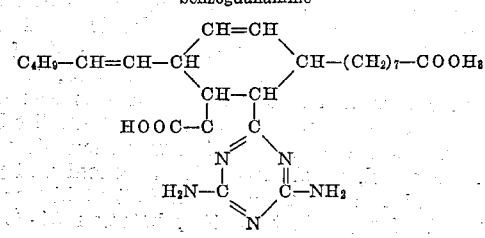

305 parts of a methyl α and β eleostearate-maleic anhydride adducts prepared by condensing the methyl ester of tung oil acids with maleic anhydride by the Diels-Alder reaction was refluxed for three to four hours with 403 parts of methanol. The free acid was then converted to the sodium salt by slowly adding 15.4 parts of dissolved sodium in methanol with vigorous stirring. 70 parts of biguanide were added and the mixture allowed to stand at room temperature until reaction appeared complete. The solution darkened somewhat on the addition of the biguanide. The guanamine was isolated by recovering the methanol by evaporation and acidifying a water solution of the product with hydrochloric acid. After extracting several times with carbon tetrachloride, the guanamine salt which formed an immiscible layer, was neutralized with ammonium hydroxide and the insoluble product washed three times with water and dried. The guanamine was obtained as a light brown brittle product which softens from 70–95° C., the yield being about 64%.

Example 4 o-carboxy-endomethylene-tetrahydrobenzoguanamine

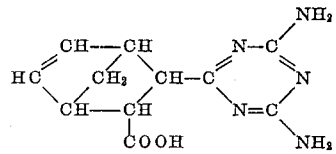

Fifty parts of biguanide were added to 109 parts of sodium methyl endomethylene-tetrahydrobenzoate dissolved in 300 parts of methanol. This reaction mixture was stirred for about 24 hours and then filtered. The insoluble sodium salt was washed with about 200 parts of methanol and the combined methanol filtrates evaporated to yield more product. The sodium salt was dissolved in 300 parts of water and acidified to a pH of about 4.0 in order to precipitate the o-carboxy-endomethylene-tetrahydrobenzoguanamine. The yield of product melting with decomposition at 227° C. was 57%.

Example 5

5-n-hexyl-6-(Δ2-n-octenyl)-3-cyclohexene-1,2-dioctanoguanamine

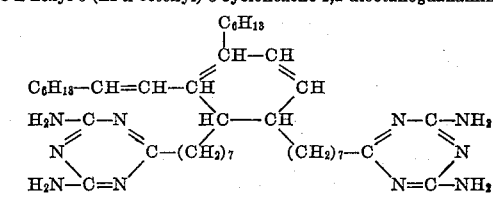

Thirty-one parts of distilled dimerized methyl esters of soy bean oil prepared as given in Industrial Engineering Chemistry 32, 806 (1940) and 33, 86 (1941) was added to a solution of 10 parts of biguanide in 80 parts of methanol and 90 parts of ethanol. After standing for about a day, a small amount of an insoluble material was removed by filtration and the filtrate was evaporated. The residue was extracted with 600 parts of acetone which yielded 16 parts of a crystalline product that was recrystallized from ethyl acetate. After thoroughly drying the colorless product melted at 75–78° C. and was identified as a guanamine having the above formula.

What I claim is:

1. A method of preparing an alicyclic guanamine which comprises dissolving a biguanide and an ester of an alicyclic carboxylic acid in a common solvent whereby reaction and precipitation of the resultant guanamine is instituted, continuing the reaction until precipitation substantially ceases, and collecting the resultant guanamine.

2. A method of preparing an alicyclic guanamine which comprises dissolving biguanide and an ester of an alicyclic carboxylic acid in a common solvent whereby reaction and precipitation of the resultant guanamine is instituted, continuing the reaction until precipitation substantially ceases, and collecting the resultant guanamine.

3. A carboxy-endomethylene-tetrahydrobenzoguanamine.

4. A carboxy - isopropyl-methyl-endoethylene tetrahydrobenzoguanamine.

5. A method according to claim 1 in which the reaction takes place in the presence of a metal alkoxide.

6. A method according to claim 2 in which the reaction takes place in the presence of a metal alkoxide.

7. A method according to claim 1 in which a metal alkoxide is present in the reaction in substantially stoichiometrical proportions.

8. A method according to claim 2 in which a metal alkoxide is present in the reaction in substantially stoichiometrical proportions.

JACK THEO THURSTON.